United States Patent

[11] 3,590,635

| [72] | Inventor | Walter O. Duing<br>Miami, Fla. |
|---|---|---|
| [21] | Appl. No. | 33,755 |
| [22] | Filed | May 1, 1970 |
| [45] | Patented | July 6, 1971 |
| [73] | Assignee | The United States of America as represented by the Secretary of the Navy |

[54] PYCNOCLINE FOLLOWER APPARATUS
7 Claims, 2 Drawing Figs.

| [52] | U.S. Cl. | 73/170 A, 73/300 |
|---|---|---|
| [51] | Int. Cl. | G01f 23/10 |
| [50] | Field of Search | 73/170 A, 300 |

[56] References Cited
UNITED STATES PATENTS

| 2,839,920 | 6/1958 | MacAnespie | 73/170 A |
|---|---|---|---|
| 3,301,047 | 1/1967 | Wald, Jr. et al. | 73/170 A |

*Primary Examiner*—Jerry W. Myracle
*Attorneys*—Richard S. Sciascia and Paul N. Critchlow ABSTRACT: Observation and study of internal waves in the main pycnocline of an ocean area is achieved by providing a pycnocline follower capable of being prebalanced to a particular density within the range of a predetermined density gradient of the pycnocline. As internal wave conditions produce density variations the pycnocline follower moves up and down. A time-related pressure-recorder system carried by the follower provides data on the varying pressure which closely corresponds to the amplitude and period of the internal-wave-producing the movement. The follower is mounted on a thin wire that is anchored, buoyed and tensioned sufficiently to maintain a vertical disposition in the presence of anticipated horizontal currents. A plurality of spherical buoyant members are removably mounted in a casing of the follower to permit weight changes necessary to prebalance the follower to a desired density. The recording system is carried by one of the buoyant members.

PATENTED JUL -6 1971 3,590,635

INVENTOR
WALTER O DUING
BY
ATTORNEY

3,590,635

PYCNOCLINE FOLLOWER APPARATUS

The invention described herein may be manufactured and used by or for the Government of the United States of America for governmental purposes without the payment of any royalties thereon or therefor.

BACKGROUND OF THE INVENTION

The present invention relates to apparatus for observing internal waves in the main pycnocline of an ocean area.

The existence of a marked pycnocline is one of the most characteristic features of the upper layer of certain ocean areas, this layer sometimes being referred to as a thermocline. Although the term pycnocline may be nongeneric since it implies a variation in density dependent principally upon the variations in both temperature and salinity. Numerous oceanographic observations have shown that the depth of the pycnocline varies considerably, the amplitude ranging from a few centimeters to several decameters and the periods from a few minutes to a year. Also, considerable differences may exist in the depth of the pycnocline over quite small horizontal distances.

Even though much data has been developed, there is a need for more complete and accurate knowledge still of the actual three-dimensional distribution and dynamics of the pycnocline not only to serve the purposes of basic oceanographic research but, more especially, for use in applied oceanography. To achieve this observations knowledge, several approaches have been in rather common use. Thus, measurements can be made either from a drifting vessel, an anchored vessel or from fixed stations in shallow water. Also, measurements with anchored instruments in both shallow and deep water have been attempted. As to these methods, those utilizing drifting vessels are of limited value due to the drift, while those from anchored vessels, although of higher quality, require the anchoring of the ship in great depths. This anchoring is a difficult operation which only a few research vessels are equipped to achieve. The fixed station, such as the oceanographic tower, permits a diversity of observations but has the disadvantage that it is limited to relatively shallow water. Further, all three of these methods entail very high installation and maintenance costs. The trend, apparently, is toward the use of anchored self-contained instruments which are more versatile and considerably less expensive. However, experience with existing devices shows a high degree of instrument loss particularly when long anchor chains are used. Further, from a functional viewpoint, the sensors, such as the thermistors and current meters used as a part of these anchored instruments, achieve their measurements at fixed depths and therefore do not permit differentiation between the variations caused by horizontal advective motions and those caused by vertical motions, such as internal waves.

It is therefore an object of the present invention to provide a relatively low-cost anchored instrument for use in shallow or deep water, the instrument being capable of providing accurate data regarding vertical motions produced by internal waves in the pycnocline or mixed layer of the ocean.

A more specific object is to provide a pycnocline or density follower capable of responding to density variations in the pycnocline so as to follow the vertical motions of the internal waves that produce these changes of density.

A further object is to provide a pycnocline follower in accordance with previous objects, the follower being capable of providing information regarding both the amplitude and periods of the internal waves, this object, in general, featuring the use of a time-dependent pressure recorder carried by the follower itself.

Another object is to provide a simple, unattended pycnocline follower incorporating features to minimize horizontal drag coefficients produced by horizontal currents, the reduction of drag improving the sensitivity and reliability of the recordings.

These and other objects are achieved by utilizing a taut wire mooring with a subsurface buoy and, preferably, a small marker buoy on the sea surface. The pycnocline follower is rollably mounted on the wire and, most suitably, includes a free-flooding elongate casing in which is mounted a plurality of buoyant members, such as glass spheres. One of these members encases a self-contained pressure-recorder system to register depth variations of the follower. To achieve the depth variations, the follower is prebalanced to a desired density in the range of the high-density gradient so that, as the internal wave movement varies the level of the high-density gradient, the follower moves up and down on the wire. The wire itself is made sufficiently taut to maintain a vertical disposition within a limited angle of inclination when exposed to horizontal current forces. Streamlining of the casing of the follower further reduces the horizontal drag forces and, preferably, the casing has a keel so as to be capable of achieving a trimmed disposition in the ocean medium. Such an arrangement, which includes other features to be discussed subsequently, has a number of distinct advantages one of which is the ability to obtain direct vertical variations around an average depth. This advantage contrasts with the results obtainable with other anchored instruments in which the current meters and other sensors must be deployed at several fixed levels to determine internal wave distributions.

BRIEF DESCRIPTION OF THE DRAWINGS

The invention is illustrated in the accompanying drawings of which.

DETAILED DESCRIPTION OF THE INVENTION

Figure 1:
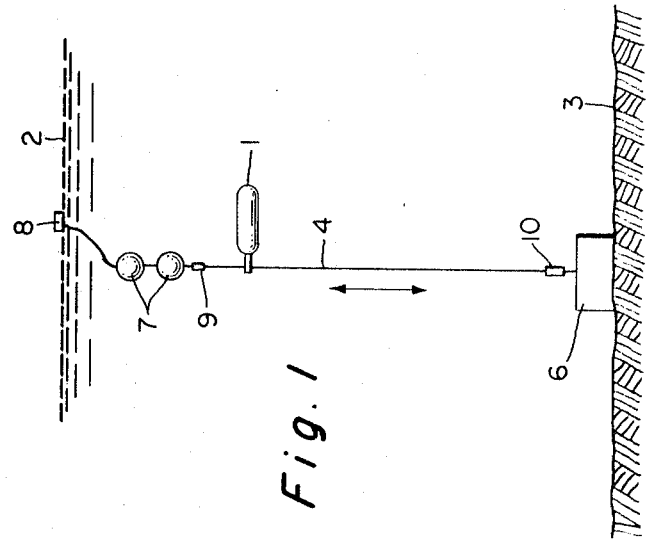
FIG. 1 schematically illustrates the present pycnocline follower system and manner in which it is deployed in an ocean area.

Referring to FIG. 1, a pycnocline follower, identified by numeral 1, is shown deployed in an ocean area marked by a surface 2 and a bottom 3. The follower is rollably mounted in a manner to be described on a thin wire 4 moored by a concrete anchor 6 and held in a taut vertical position by a subsurface buoy 7 planted about $10^{115}m$. below surface 2. Buoy 7 is coupled by a line to a surface marker buoy 8 to facilitate recovery operations. For reasons to be considered, the wire should be tensioned sufficiently to maintain a substantially vertical disposition when subjected to horizontal currents that tend to produce an inclination angle. More specifically, a wire tension of about 150—200 kg. is employed. A normal hydrographic wire has been found adequate for the present purposes and, to minimize errors due to twisting the wire is coupled at each end by rotating Miller swivels 9 and 10.

Figure 2:
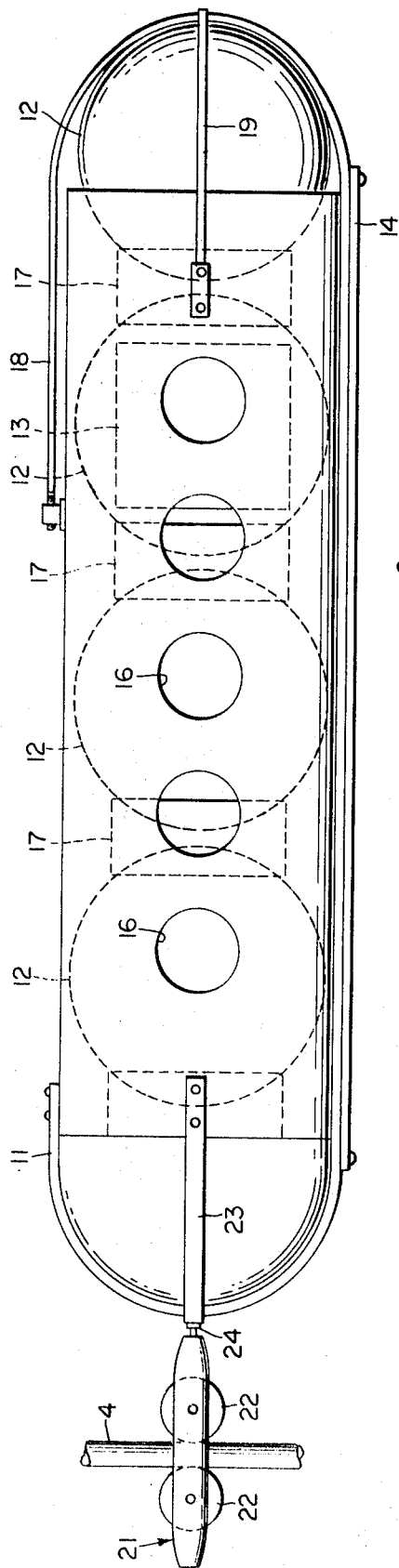
FIG. 2 is a schematic representation of the follower itself.

Referring to FIG. 2, the principal structural components of the follower include a cylindrical, elongate, plastic housing or casing 11 adapted to contain a plurality of buoyant members 12 which, in the present embodiment, may be provided by four Benthos glass spheres three of which are used to provide the necessary buoyancy, while the fourth contains a depth-recorder system identified in FIG. 2 by numeral 13. Although the physical size of casing 11 may vary, present models are about 130 cm. in length and 27 cm. in diameter. The housing or casing carries a movable horizontal keel member 14 which provides the capability of trimming the follower in a horizontal position and, further, as indicated in FIG. 2, the housing is streamlined to minimize drag produced by horizontal currents. Drag, of course, is undesirable since it tends to produce an inclination which affects the free vertical movement of the follower.

To eliminate the possibility of air bubbles being trapped in the housing, a number of holes 16 are provided, these holes permitting a free flooding of the housing interior. This free flooding is needed to expose the buoyant member directly to the sounding pressures. Spheres 12 are disposed side by side within the housing and are spaced one from another by spacers 17. Also, since it is desirable to prebalance the follower in accordance with the density at which it is to function, the spheres are removably held in their space disposition by straps 18 and 19 which are removably secured to the housing.

Housing 11 is coupled to wire 4 by guide member 21 which mounts rollers 22 that directly engage the wire, the rollers being made as large as possible to minimize the frictional engagement. Guide member 21 is secured by strap 23 to the follower and another swivel 24 is used in the coupling to minimize jamming which can be produced by horizontal torques.

Pressure-recording system 13 is, as already stated, housed in one of the Benthos glass spheres which, preferably, has a diameter of about 25 cm. Although any type of recording system can be provided, the one presently in use employs a Bourdon tube pressure gage driving a potentiometer which is part of an unbalanced bridge circuit used to provide zero suppression. Recordings may be made on a battery-driven Rustrak recorder and a Geodyne clock provides hourly time marks. The maximum recording time with such an arrangement is approximately 50 days. As will be appreciated, an arrangement of this type, which couples a conventional commercially available pressure gage with a conventional recorder is well within the skill of any person knowledgeable in this art and, for this reason, details of the system have not been illustrated.

The operation of the present pycnocline follower should be somewhat apparent from the foregoing description. As already stated, the principal objective is to provide a simple, unattended follower capable of recording, by means of a self-contained pressure recorder, depth variations for periods of up to several weeks or more. Prior to exposing the follower to the depth variations, it first should be prebalanced to the desired density in the range of the high-density gradient and this prebalancing can be accomplished by balancing the follower in a tank filled with homogeneous water of known density. The buoyancy of the follower can be adjusted in this tank to provide a slight negative buoyancy. Next, the "overweight" can be determined by hydrostatical weighting and the necessary additional weight to achieve the desired density then computed using the total volume of the instrument as a known factor. During these tank procedures, the horizontal trim of the follower also can be adjusted although a further check of the trim may be made later by the diver who is used to attach the instrument to the mooring.

A number of experiments have been conducted using a follower such as that which has been described. For example, two experimental attempts were made to determine how faithfully the present pycnocline follower duplicates the motions of the internal waves. For this purpose the experiments were conducted in Hawaiian waters in which the dominant influence on the vertical density distribution stemmed almost wholly from temperature rather than salinity variation. Consequently, by assuming a constant salinity distribution, it was possible to distinguish between three types of behavior, i.e., perfect following, undershooting and overshooting. In the first case, a temperature recorder attached to the follower should register a straight line of constant temperature. In the case of undershooting, the temperature sensor would record warmer temperatures at downward motions and colder temperatures at upward motions. The opposite, obviously, would occur in the case of overshooting, although these results would be true only if there is no phase lag which does not seem to be the case. In the experiments none of the three types of behavior stood out clearly in the temperature record. In general, however, the temperature during these experiments fluctuated randomly around an average value of 22.9° C., the maximum deviation being ±0.5° C. At a measured salinity of 35.0°/oo, a corresponding density change of $0_f=24.00\pm0.15$ resulted. In an average density distribution for the Hawaiian area, this would correspond to a depth change of ±3 m. For an average amplitude of 25 m., an error of 12 percent would result. This result, in turn, is in agreement with theoretical results which can be computed for varying density gradients, the agreement in this instance existing when a density gradient is assumed which has a variation between $2\times10^{17}$ and $5\times10^{17} g$, $cm.^{14}$. Other experiments also demonstrate reasonably reliable results to the extent that the follower has demonstrated its ability to provide valuable data particularly when its results are compared with results obtained from instruments deployed from anchored vessels. In the latter the dragging of the ship's anchor and the swaying on the anchor line introduced conditions which seriously affected the reliability of the observations.

Other factors play a significant role both in the design and use of the present follower. For example, any instrument of this type is subjected to the forces produced by horizontal currents, although it is for this reason that the drag coefficient of the instrument is reduced to the maximum extent by streamlining its housing. Also, the reduction of the friction along the wire should be reduced by increasing the roller radius to a maximum extent which also should take into consideration the increase in drag force produced if too large a roller is employed. Further, it is desirable to maintain the angle of inclination of the taut wire as close to a vertical disposition as is possible and this minimization of the angle can be achieved by controlling the tautness of the support wire. For example, using a wire tension of approximately 150—200 kg., it was found that the effects of horizontal currents would not be significant when the follower is exposed to currents of 30—40 $cm./sec.^{11bv, which, at}$ 100 to 150 m. depth, represents a high current value for most ocean areas. Another factor to be considered in the practical design of the instrument is the compressibility of the instrument itself and, in this regard, it should be noted that optimum operation results when there is little or no difference between the compressibility of the instrument and that of sea water. If there is a substantial difference of compressibility, the density of the follower will change to a greater or lesser degree than the density of the water particles and the follower then will undershoot or overshoot. Consequently, materials for the construction of the instrument should be selected to produce a total compressibility approaching that of sea water. Although each of these factors theoretically enters into the production of an instrument capable of producing a perfect following of the density variations, theoretical perfection probably is not obtainable and some compromises must be made. Even so, the instrument as already described has been found to produce reliable data regarding the amplitude and period of internal waves particularly for current velocities from 0 to 40 $cm./sec.^{11}$ and it is believed that its simplicity, its relative low cost and its capabilities as compared with other anchored instruments or those used in conjunction with oceanographic towers or the like cumulatively establish its comparative usefulness.

Obviously many modifications and variations of the present invention are possible in the light of the above teachings. It is therefore to be understood that within the scope of the appended claims the invention may be practiced otherwise than as specifically described.

I claim:

1. Apparatus for observing internal waves in the main pycnocline of an ocean medium comprising:
   an anchor;
   a buoy;
   a wire securing the buoy in a submerged position near the surface of said ocean medium to the anchor, said buoy tensioning said wire sufficiently to maintain the wire in substantially a vertical disposition; and
   a pycnocline follower rollably engaging said wire for movement up and down said wire responsive to density changes accompanying internal wave movements, said follower including:
   an elongate free-flooding casing;
   a plurality of buoyant members movably mounted in said casing; and
   a self-contained time-related pressure-recorder system housed on one of said buoyant members, said follower being prebalanced to a particular density within the range of a predetermined density gradient of the pycnocline whereby variations of said density cause the follower to move up and down the wire, said recorder responding to pressure variations for providing time-dependent data pertinent to internal wave periods and amplitudes.

2. The apparatus of claim 1 further including a surface buoy coupled to said submerged buoy.

3. The apparatus of claim 1 wherein said casing is provided with a streamlined exterior shape for minimizing drag and said wire tension is sufficient to substantially maintain its desired vertical disposition when subjected to horizontal currents up to 40 cm./sec.

4. The apparatus of claim 3 wherein said follower casing is formed with a keel member for maintaining horizontal trim.

5. The apparatus of claim 4 wherein the in situ compressibility of the follower approximates the compressing of its sea water operating environment.

6. The apparatus of claim 4 wherein swivel connections are employed for coupling said wire to both said anchor and said submerged buoy.

7. The apparatus of claim 6 wherein said follower includes a swivel coupling for absorbing torque forces produced by horizontal currents.